(12) United States Patent
Lee et al.

(10) Patent No.: US 8,190,361 B2
(45) Date of Patent: May 29, 2012

(54) NAVIGATION DEVICE AND METHOD USING MULTI-ROUTE

(75) Inventors: Chul-Hwan Lee, Yongin-si (KR); Woo-Chan Chung, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 1820 days.

(21) Appl. No.: 11/265,940

(22) Filed: Nov. 3, 2005

(65) Prior Publication Data

US 2006/0100778 A1 May 11, 2006

(30) Foreign Application Priority Data

Nov. 8, 2004 (KR) .................. 10-2004-0090582

(51) Int. Cl.
*G01C 21/34* (2006.01)

(52) U.S. Cl. ............... 701/414; 340/995.19; 340/995.21; 701/416

(58) Field of Classification Search .......... 701/208–213, 701/414; 342/357.01–9, 357.08
See application file for complete search history.

(56) References Cited

U.S. PATENT DOCUMENTS

| | | | | |
|---|---|---|---|---|
| 5,291,413 | A * | 3/1994 | Tamai et al. .................. | 701/416 |
| 6,298,303 | B1 * | 10/2001 | Khavakh et al. .............. | 701/533 |
| 6,487,497 | B2 * | 11/2002 | Khavakh et al. .............. | 701/410 |
| 6,678,611 | B2 * | 1/2004 | Khavakh et al. .............. | 701/418 |
| 6,941,220 | B2 * | 9/2005 | Le et al. ........................ | 701/208 |
| 7,054,742 | B2 * | 5/2006 | Khavakh et al. .............. | 701/411 |
| 7,940,194 | B2 * | 5/2011 | Goto et al. ................. | 340/932.2 |
| 2001/0047241 | A1 * | 11/2001 | Khavakh et al. .............. | 701/209 |
| 2003/0028319 | A1 * | 2/2003 | Khavakh et al. .............. | 701/209 |
| 2004/0039520 | A1 * | 2/2004 | Khavakh et al. .............. | 701/201 |
| 2004/0236498 | A1 * | 11/2004 | Le et al. ........................ | 701/200 |
| 2006/0080034 | A1 * | 4/2006 | Hayashi ........................ | 701/211 |
| 2006/0100778 | A1 * | 5/2006 | Lee et al. ...................... | 701/210 |
| 2009/0005964 | A1 * | 1/2009 | Forstall et al. ................ | 701/201 |
| 2009/0153362 | A1 * | 6/2009 | Goto et al. ................. | 340/932.2 |

FOREIGN PATENT DOCUMENTS

| | | | |
|---|---|---|---|
| DE | 102009047713 A1 | * | 6/2011 |
| KR | 10-2004-0092093 | | 11/2004 |
| KR | 2006041101 A | * | 5/2006 |

(Continued)

OTHER PUBLICATIONS

Multiobjective route selection for car navigation system using genetic algorithm; Chakraborty, B.; Maeda, T.; Chakraborty, G.; Soft Computing in Industrial Applications, 2005. SMCia/05. Proceedings of the 2005 IEEE Mid-Summer Workshop on Digital Object Identifier: 10.1109/SMCIA.2005.1466971; Publication Year: 2005 , pp. 190-195.*

(Continued)

*Primary Examiner* — Cuong H Nguyen
(74) *Attorney, Agent, or Firm* — The Farrell Law Firm, P.C.

(57) ABSTRACT

A navigation device is provided. The device includes a driving state tracker for tracking a mobile driving state using a current mobile position and RGI (Route Guidance Information) data including driving information on multi-routes from the current mobile position to a destination, and outputting deviation information and the current mobile position when a mobile object is deviated from a route; and a re-routing unit for searching partial routes from a mobile deviation position to each of the multi-routes using the deviation information, the current mobile position and the driving information on the multi-routes, and re-routing a route to the destination using each of the partial routes.

22 Claims, 5 Drawing Sheets

FOREIGN PATENT DOCUMENTS

| | | | |
|---|---|---|---|
| KR | 678254 B1 | * | 2/2007 |
| KR | 689512 B1 | * | 3/2007 |
| WO | WO 2007105499 A1 | * | 9/2007 |
| WO | WO 2011006527 A1 | * | 1/2011 |

OTHER PUBLICATIONS

Enhanced Continuous KNN Queries Using PINE on Road Networks; Safar, M.; Digital Information Management, 2006 1st International Conference on; Digital Object Identifier: 10.1109/ICDIM.2007.369361; Publication Year: 2007, pp. 248-256.*

Mobility Index-Based Navigation for Mandatory Re-Routing Scenarios; Weihua Zhu; Boriboonsomsin, K.; Barth, M.; Intelligent Transportation Systems, 2008. ITSC 2008. 11th International IEEE Conference on; Digital Object Identifier: 10.1109/ITSC.2008.4732658; Publication Year: 2008, pp. 581-586.*

Onalin: Ontology and Algorithm for Indoor Routing; Dudas, P.M.; Ghafourian, M.; Karimi, H.A.; Mobile Data Management: Systems, Services and Middleware, 2009. MDM '09. Tenth International Conference on; Digital Object Identifier: 10.1109/MDM.2009.123; Publication Year: 2009, pp. 720-725.*

* cited by examiner

NAVIGATION DEVICE AND METHOD USING MULTI-ROUTE

PRIORITY

This application claims priority under 35 U.S.C. §119 to an application entitled "Navigation Device and Method Using Multi-Route" filed in the Korean Intellectual Property Office on Nov. 8, 2004 and assigned Serial No. 2004-90582, the contents of which are incorporated herein by reference.

BACKGROUND OF THE INVENTION

1. Field of the Invention

The present invention relates generally to a navigation device and method in which a route for a mobile object is determined using a navigation system, and in particular, to a navigation device and method in which a route from a mobile deviation position to a destination is determined using a multi-route when the mobile object deviates from the route.

2. Description of the Related Art

In general, navigation systems are installed in a variety of mobile objects such as a ship, an aircraft, a vehicle and the like. The navigation system informs a driver of current position, calculates an optimal route to a desired destination, and guides the driver on the route. To do so, the navigation system receives GPS (Global Positioning System) information including latitude, longitude and altitude from a plurality of satellites belonging to a GPS to calculate current mobile position. In the navigation system, map matching is performed using current position and previously stored map data, and driving position is tracked on a map to provide guidance from the current position to the destination. In this way, the optimal route from the current position to the desired destination can serve the driver. However, even though the mobile object is navigated, the mobile object may deviate from the route due to driver's carelessness or other causes.

When the mobile object deviates from the route, the navigation system ignores all routes previously searched, and re-searches (re-routes) a route from the deviated position to the destination. This is disadvantageous because it takes a long time to re-search a new route, and so the route to the destination cannot be promptly provided for a user. Further, when the route from the deviation position to the destination is re-searched, current vehicle direction and features (e.g. U-turn) of the currently traveled road are not considered. As a result, the driver may actually take a less-than-optimal route under guidance of the navigation system.

SUMMARY OF THE INVENTION

It is, therefore, an object of the present invention to provide a navigation device and method in which when a mobile object is deviated from a route, a route from a mobile deviation position to a destination is promptly re-searched and guided using a multi-route.

It is another object of the present invention to provide a navigation device and method in which when a mobile object is deviated from a route, partial routes from a mobile deviation position to each of multi-routes are searched using the multi-route and a route from the mobile deviation position to a destination is promptly re-searched and guided using each of the partial routes.

It is a further object of the present invention to provide a navigation device and method in which when a mobile object is deviated from a route, a route from a mobile deviation position to a destination is re-searched and guided considering a current mobile progress direction and features of the road (U-turn road) on which the mobile object is currently positioned.

To achieve the above and other objects, there is provided a navigation device including a driving state tracker for tracking a mobile driving state using a current mobile position and RGI (Route Guidance Information) data including driving information on multi-routes from the current mobile position to a destination, and outputting deviation information and the current mobile position when a mobile object is deviated from a route; and a re-routing unit for searching partial routes from a mobile deviation position to each of the multi-routes using the deviation information, the current mobile position and the driving information on the multi-routes, and re-routing a route to the destination using each of the partial routes.

In another aspect of the present invention, there is provided a navigation method for a navigation device, the method including comparing driving information on multi-routes from a current mobile position to a destination with a mobile position on a map to track a mobile driving state; determining whether or not a mobile object is deviated from a route depending on the driving information, as the tracked result; and if the mobile object is deviated from the route, searching partial routes from a mobile deviation position to each of the multi-routes and re-routing a route to the destination using each of the partial routes.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for conciseness.

Figure 1:
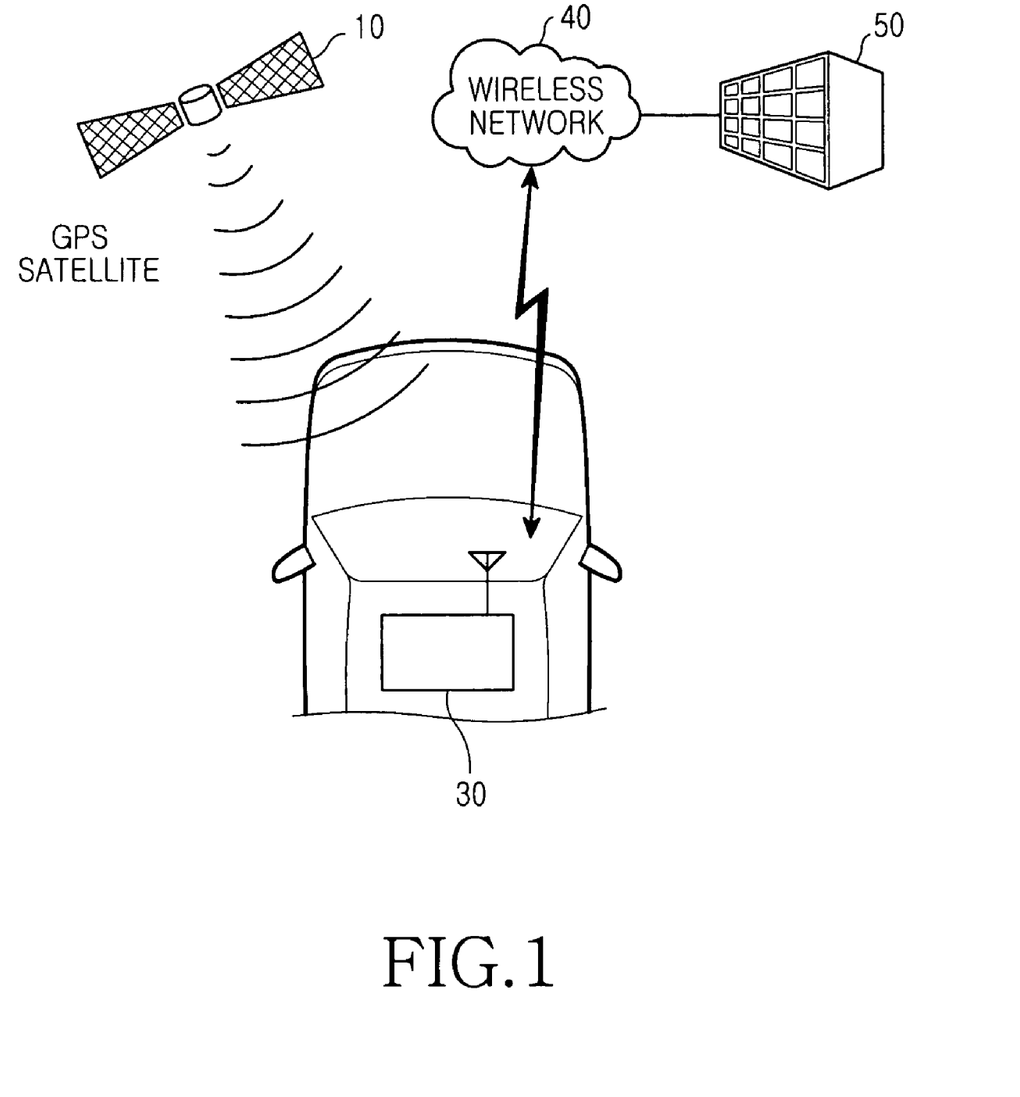
FIG. 1 is a schematic view illustrating construction of a navigation system according to an embodiment of the present invention.

FIG. 1 is a schematic view illustrating construction of a navigation system according to an embodiment of the present invention. Referring to FIG. 1, the inventive navigation system includes a global positioning system (GPS) satellite 10, a navigation device 30, and an information server 50.

The GPS satellite 10 transmits GPS information having latitude, longitude, altitude and the like to the ground. In the information server 50, driving information is constructed and provided in a predetermined data format, that is, in a format of route guidance information (RGI) data. The RGI data is the driving information of a link unit. The RGI data includes road information having road features such as a straight road, a U-turn road, a crossroad and the like. The RGI data includes the driving information on a multi-route.

In the navigation device 30, the GPS information is received from the GPS satellite 10 to calculate a current position of a mobile object (that is, a vehicle). The current vehicle position is determined using map data previously stored. The navigation device 30 receives the RGI data from the information server 50 through a wireless network 40 and analyzes a format of the received RGI data to obtain the driving information at a corresponding position.

A variety of navigation information required for driving is provided to a driver. For example, current position, GPS information, and the driving information are used to determine and display a current velocity of the vehicle, a driving route being set by the driver before driving, and an optimal route and multiple routes, or multi-routes from a departure to a destination on a screen. When the vehicle deviates from the navigation route, the navigation device 30 searches partial routes from the deviation position to each of the multi-routes, and promptly re-searches a route to the destination using each of the partial routes, and determines a new route depending on the re-searching result. Construction of the navigation device 30 for guiding the route from the mobile deviation position to the destination is shown in FIG. 2.

Figure 2:
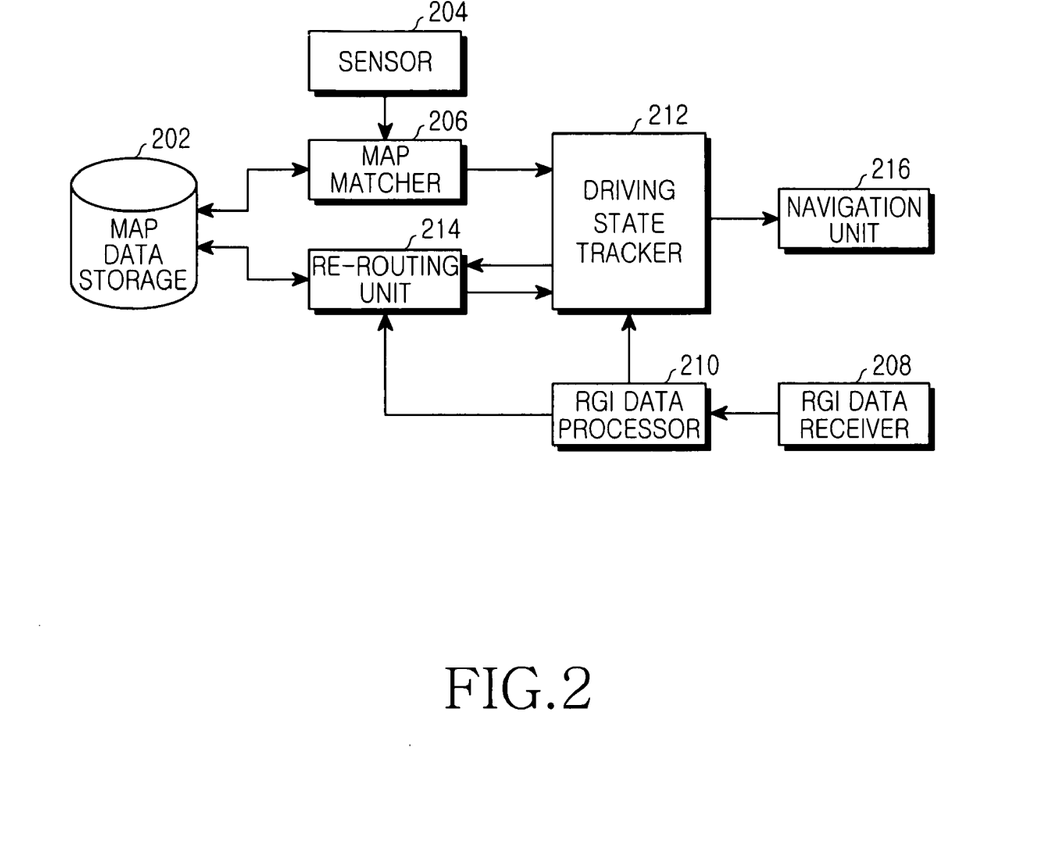
FIG. 2 is a block diagram illustrating a navigation device according to an embodiment of the present invention.

FIG. 2 is a block diagram illustrating the navigation device 30 according to an embodiment of the present invention. Referring to FIG. 2, the inventive navigation device 30 includes a map data storage 202, a sensor 204, a map matcher 206, a RGI data receiver 208, a RGI data processor 210, a driving state tracker 212, a re-routing unit 214 and a navigation unit 216.

The map data storage 202 stores map data. The sensor 204 measures current vehicle position, and includes a GPS sensor (not shown) and a dead reckoning (DR) sensor (not shown). The GPS sensor receives a GPS signal from the GPS satellite 10, and detects vehicle position information (x, y, z) and time information (t) from the GPS signal. The DR sensor measures a relative vehicle position and direction using previous position information, and detects a velocity (v) and an angle (θ) of the vehicle. In the sensor 204, the current vehicle position is calculated using the detected position information (x, y and z) and time information (t), with the detected velocity (v) and angle (θ).

In the map matcher 206, map matching is performed using the current vehicle position and the map data stored in the map data storage 202. The map matcher 206 checks whether the current vehicle position corresponds to any position on the map using the current vehicle position and the map data, to match the current vehicle position to the map.

In the RGI data receiver 208, the RGI data (hereinafter, referred to as "first RGI data") on the multi-route from the current vehicle position to the destination is received from the information server 50. In the RGI data processor 210, the format of the first RGI data is analyzed to provide the link-unit driving information on the first RGI data to the driving state tracker 212 and the re-routing unit 214. The link-unit driving information includes driving information on the multi-route. The RGI data processor 210 receives RGI data (Hereinafter, referred to as "second RGI data") to provide driving information on the second RGI data to the driving state tracker 212. The second RGI data is generated in the re-routing unit 214 when the vehicle deviates from the route.

The driving state tracker 212 receives the map matching result from the map matcher 206 and the driving information from the RGI data processor 210. The driving state tracker 212 compares a position of the driving information with the current vehicle position on the map using the received map matching result and driving information, thereby tracking a vehicle driving state (speed and direction) and outputting the tracked result. As the comparative result, if it is determined that the vehicle is deviated from the route, the driving state tracker 212 transmits deviation information (starting point of deviation) and the current vehicle position to the re-routing unit 214, and tracks the vehicle driving state using the second RGI data.

The re-routing unit 214 receives the deviation information and the current vehicle position from the driving state tracker 212, and the driving information on the multi-route from the RGI data processor 210. The re-routing unit 214 searches the partial routes from the mobile deviation position to each of the multi-routes using the received deviation information and current vehicle position and the received driving information, and promptly re-searches (re-routing) a new route to the destination using each of the partial routes.

The re-routing unit 214 detects information on a link where the deviated vehicle is positioned and information on an adjacent link where the deviated vehicle is positioned, using the received deviation information and current vehicle position, and the received driving information on the multi-route. The re-routing unit 214 searches the partial routes from the link where the deviated vehicle is positioned to each of the multi-routes, using the information on the adjacent link. The re-routing unit 214 determines whether or not each of the partial routes has a U-turn link. The re-routing unit 214 re-searches (re-routes) the new route to the destination, using each of the partial routes, depending on whether or not each of the partial routes has a U-turn link. The re-routing unit 214 generates and transmits the second RGI data on a shortest-distance partial route, to the RGI data processor 210.

The navigation unit 216 receives the tracked result and the deviation information from the driving state tracker 212 to guide the driver to the route and inform the driver of whether or not the vehicle has deviated from the route.

The above-described navigation device 30 can be installed in the mobile object (that is, the vehicle) as one navigation terminal or as a combined navigation terminal and mobile terminal.

Hereinafter, a navigation method using the navigation device 30 will be described.

Figure 3:
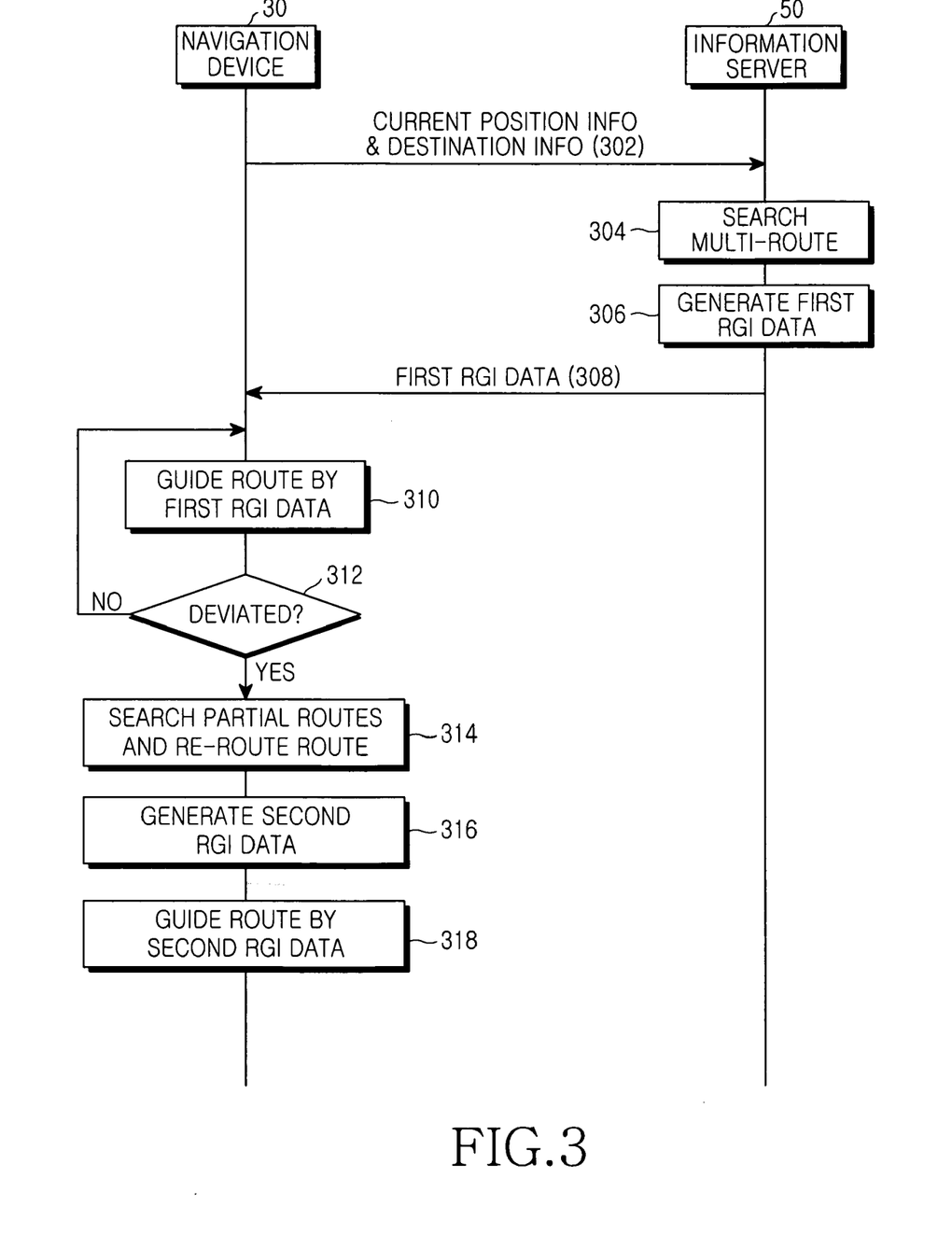
FIG. 3 is a flowchart illustrating a navigation method according to an embodiment of the present invention.

FIG. 3 is a flowchart illustrating the navigation method according to an embodiment of the present invention. Referring to FIG. 3, when the driver is guided along the route to the destination, the navigation device 30 receives the GPS information to detect current position information, and transmits the current position information and destination information to the information server 50 in step 302. After that, the information server 50 searches the multi-route to the corresponding destination using the previously stored map data, the real-time traffic information and the like in step 304. The information server 50 generates the first RGI data on the searched multi-route in step 306, and transmits the generated first RGI data to the navigation device 30 through the wireless network 40 in step 308. At this time, the information server 50 receives the real-time traffic information from an external server (for example, traffic server), or collects and manages the real-time traffic information itself.

The navigation device 30 receives the first RGI data from the information server 50, and determines the route using the received first RGI data in step 310. That is, the navigation device 30 analyzes the first RGI data to extract driving information on the multi-route, and compares the position of the driving information on the multi-route with the current vehicle position on the map to track the vehicle driving state and determine the route depending on the tracked result.

The navigation device 30 determines whether or not the vehicle has deviated from the route as the tracked result of the vehicle driving state in step 312. If the position of the driving information on the multi-route is more than a predetermined distance from the current vehicle position on the map, the navigation device 30 determines that the vehicle has deviated from the route. If it is determined that the vehicle has not deviated from the route, the navigation device 30 continues to navigate, repeating the loop of steps 310 and 312 until before the vehicle arrives at the destination. If it is determined that the vehicle has deviated from the route, the navigation device 30 searches the partial routes from the current vehicle deviation position to each of the multi-routes, and re-searches (re-routes) the route to the destination using each of the partial routes in step 314. The second RGI data is generated at step 316 and then used to navigate the new route to the destination at step 318.

Figure 4:
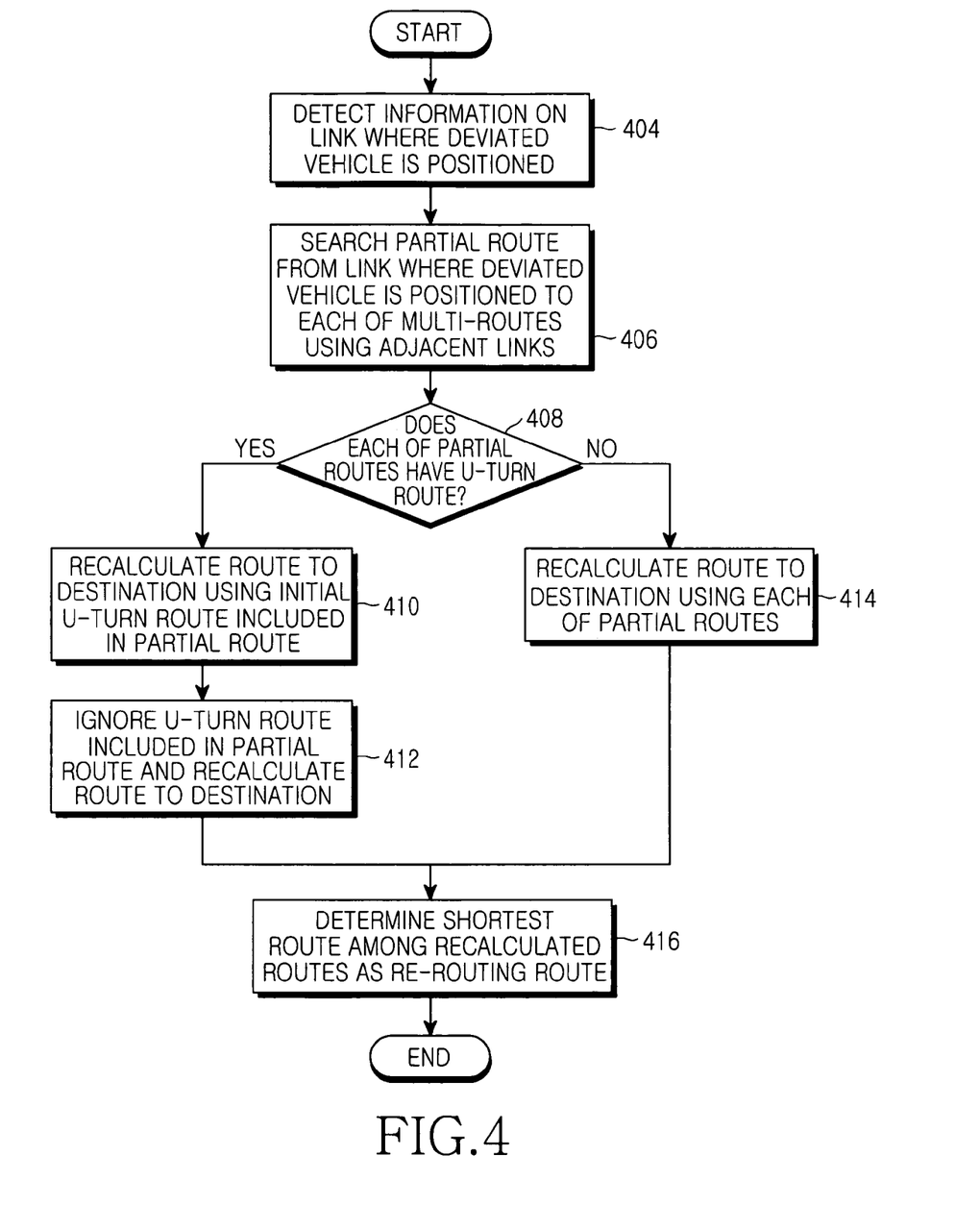
FIG. 4 is a flowchart illustrating a method of determining a re-routing route from a mobile deviation position to a destination according to an embodiment of the present invention.
Figure 5:
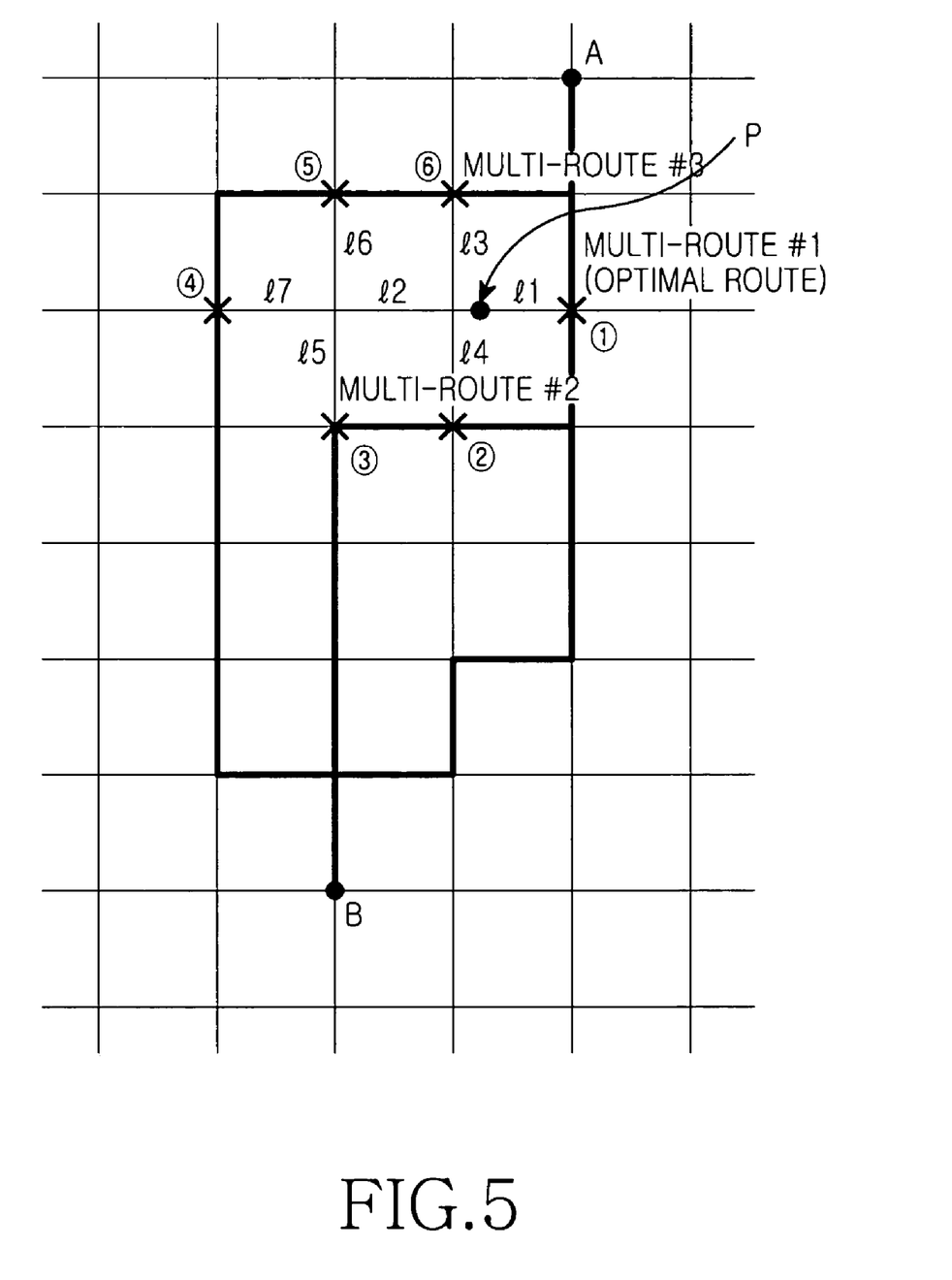
FIG. 5 is a diagram illustrating a process of determining a re-routing route from a mobile deviation position to a destination according to an embodiment of the present invention.

FIG. 4 is a flowchart illustrating a re-routing process according to an embodiment of the present invention, and FIG. 5 is a diagram illustrating the re-routing process according to an embodiment of the present invention.

Hereinafter, the re-routing process of step 314 will be described in detail with reference to FIGS. 4 and 5.

If it is determined that the vehicle has deviated from the route, the navigation device 30 detects the information on the link where the deviated vehicle is positioned in step 404. FIG. 5 illustrates three multi-routes ("MULTI-ROUTE #1", "MULTI-ROUTE #2", and "MULTI-ROUTE #3") from point "A" (departure) to point "B" (destination). As shown in FIG. 5, the vehicle runs through "P" point (deviation position) from "MULTI_ROUTE #1" (optimal route). If the vehicle deviates from the route as described above, the navigation device detects the information on the link (l1) where the deviated vehicle is positioned.

Next, in step 406, the navigation device 30 searches all the partial routes from the link where the deviated vehicle is positioned to each of the multi-routes. For example, as shown in FIG. 5, the navigation device 30 searches all the partial routes from the link (l1) where the deviated vehicle is positioned to each of the multi-routes #1, #2 and #3. Each of the partial routes can be selected from the partial route 1 (l1, l4) from point "P" to a point (2), the partial route 2 (l1, l2, l5) from "P" to a point (3), the partial route 3 (l1, l2, l7) from "P" to a point (4), the partial route 4 (l1, l2, l6) from "P" to a point (5), and the partial route 5 (l1, l3) from "P" to a point (6).

After searching the partial routes, the navigation device 30 determines whether or not each of the partial routes has a U-turn link in step 408. The U-turn link refers to a link where the mobile object can turn around in a "U" to change driving direction. The navigation device 30 can determine whether or not each of the partial routes has the U-turn link, using the link information stored, together with the map data, in the map data storage 202.

For example, when it is assumed that the links (l2, l3) are the U-turn links in FIG. 5, the partial routes 2, 3 and 4 have the U-turn links, and the partial routes 1 and 5 do not have the U-turn links.

If it is determined that the partial routes include the U-turn links, the navigation device 30 recalculates the route to the destination via an initial deviation point using an initial U-turn route included in each of the partial routes in step 410. For example, if it is determined that the partial routes 2, 3 and 4 include the U-turn links, the navigation device 30 recalculates a route to the destination ("B") via the initial deviation point (1) using the initial U-turn route (that is, l2) included in each of the partial routes. At this time, it does not matter that the route from the point (1) to the destination ("B") among the initially searched multi-routes uses existing initially-calculated route information without re-searching or recalculating in the navigation device 30.

In the navigation device 30, the route to the destination ("B"), which does not have a U-turn, is recalculated even in the partial route including the U-turn route in step 412. That is, in the partial routes 2, 3 and 4 including the U-turn route, the route U-turning to the initial deviation point is not calculated, but the route to the destination ("B") via a contact point (e.g. the point (3) in the partial route 2) is recalculated.

The contact point is in contact with the multi-route without the U-turn. Step 412 is performed because when the shortest-distance route to the destination is searched, the route not having a U-turn can have a shorter distance than the route having the U-turn in each of the partial routes including the U-turn route.

If it is determined that the partial routes do not include the U-turn links (step 408), the navigation device 30 calculates the route to the destination ("B") using only the partial routes in step 414. That is, if it is determined that the partial routes 1 and 5 do not include the U-turn links, the navigation device 30 recalculates the route to the destination ("B") via the contact point (e.g. the point (2) in the partial route 1) being in contact with the multi-route.

After the route to the destination ("B") is recalculated using each of the partial routes, the navigation device 30 determines the shortest-distance route of the recalculated routes as a re-routing route in step 416.

After the re-routing route is determined, the navigation device 30 generates the second RGI data on the re-routing route in the step 316 of FIG. 3, and guides the route from the mobile deviation position to the destination using the second RGI data in the step 318 of FIG. 3.

As described above, the present invention has an effect in that when the vehicle is deviated from the route, the partial routes from the mobile deviation position only to each of the multi-routes are searched and the route is re-routed using each of the partial routes and the existing multi-route, so that it takes less time to re-search a new route than when the existing searched routes are all ignored and the route from the mobile deviation position to the destination is re-routed. Accordingly, the route to the destination can be promptly provided even in out-of-route.

Further, the present invention has an effect in that the route from the mobile deviation position to the destination is re-routed considering the current vehicle progress direction or the feature (e.g. U-turn road) of the road on which the vehicle is currently positioned, thereby facilitating the user to enter the re-searched new route.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A navigation device comprising:
 a driving state tracker for tracking a mobile driving state using a current mobile position and RGI (Route Guidance Information) data including driving information on multi-routes from the current mobile position to a destination, and outputting deviation information and the current mobile position when a mobile object deviates from a mobile driving route among the multi-routes; and a re-routing unit for searching partial routes from a mobile deviation position to each of the multi-routes using the deviation information, the current mobile position and the driving information on the multi-routes, and re-routing a route to the destination using each of the partial routes, wherein the re-routing unit calculates new multi-routes using the partial routes, the current mobile position and the driving information on the multi-routes, and determines a shortest distance route among the new multi-routes.

2. The device of claim 1, wherein in the re-routing unit, it is determined whether each of the partial routes has a U-turn link, and the route is re-searched (re-routed) using each of the partial routes depending on whether each of the partial routes has the U-turn link.

3. The device of claim 1, further comprising a RGI data receiver for receiving the RGI data from an external information server.

4. The device of claim 1, further comprising a sensor for detecting position information (x, y, z) and time information (t) of the mobile object and detecting a velocity (v) and an angle (θ) of the mobile object to calculate the current mobile position.

5. The device of claim 1, further comprising a map data storage for storing map data.

6. The device of claim 5, further comprising a map matcher for checking whether the current mobile position corresponds to a position on the stored map data.

7. The device of claim 1, further comprising a navigation unit for guiding the route to the destination depending on the tracked result of the mobile driving state.

8. The device of claim 2, further comprising a navigation unit for guiding the route to the destination depending on the tracked result of the mobile driving state.

9. The device of claim 3, further comprising a navigation unit for guiding the route to the destination depending on the tracked result of the mobile driving state.

10. The device of claim 4, further comprising a navigation unit for guiding the route to the destination depending on the tracked result of the mobile driving state.

11. The device of claim 5, further comprising a navigation unit for guiding the route to the destination depending on the tracked result of the mobile driving state.

12. The device of claim 6, further comprising a navigation unit for guiding the route to the destination depending on the tracked result of the mobile driving state.

13. A navigation method for a navigation device, the method comprising the steps of:
    comparing driving information on multi-routes from a current mobile position to a destination with a mobile position on a map to determine a mobile driving state;
    determining whether a mobile object deviates from a mobile driving route among the multi-routes depending on the driving information; and
    if the mobile object deviates from the route, searching by a re-routing unit of the navigation device partial routes from a mobile deviation position to each of the multi-routes and re-routing a route to the destination using each of the partial routes,
    wherein the re-routing step comprises the steps of calculating new multi-routes using the partial routes, the current mobile position and the driving information on the multi-routes, and determining a shortest-distance route among the new multi-routes.

14. The method of claim 13, wherein the re-routing step comprises the steps of:
    detecting a deviation link where the deviated mobile object is positioned;
    searching partial routes from the deviation link to each of the multi-routes using adjacent links;
    determining whether each of the partial routes has a U-turn link;
    recalculating the route to the destination using each of the partial routes, depending on whether each of the partial routes has the U-turn link; and
    performing the re-routing using a shortest-distance route of the recalculated routes.

15. The method of claim 14, wherein the step of recalculating the route to the destination comprises the steps of:
    if each of the partial routes has the U-turn link, respectively recalculating a route to the destination considering the U-turn link included in each of the partial routes and a route to the destination not considering the U-turn link included in each of the partial routes; and
    if each of the partial routes does not have the U-turn link, recalculating the route to the destination using each of the partial routes.

16. The method of claim 15, wherein in the recalculating of the route to the destination considering the U-turn link, the route to the destination is recalculated using an initial U-turn link included in each of the partial routes.

17. The method of claim 13, further comprising the step of determining the route to the destination depending on the re-routing result.

18. The method of claim 14, further comprising the step of determining the route to the destination depending on the re-routing result.

19. The method of claim 15, further comprising the step of determining the route to the destination depending on the re-routing result.

20. The method of claim 13, further comprising the step of, if the mobile object has not deviated from the route, determining the route depending on the tracked result of the mobile driving state.

21. The method of claim 14, further comprising the step of, if the mobile object has not deviated from the route, determining the route depending on the tracked result of the mobile driving state.

22. The method of claim 15, further comprising the step of, if the mobile object has not deviated from the route, determining the route depending on the tracked result of the mobile driving state.

* * * * *